United States Patent [19]
Yoneda et al.

[11] Patent Number: 5,591,547
[45] Date of Patent: Jan. 7, 1997

[54] METHOD OF MANUFACTURING A NEGATIVE ELECTRODE FOR LITHIUM SECONDARY BATTERY

[75] Inventors: Tetsuya Yoneda, Nabari; Takehito Mitate, Yamatotakada; Naoto Nishimura; Kazuo Yamada, both of Kitakatsuragi-gun, all of Japan

[73] Assignee: Sharp Kabushiki Kaisha, Osaka, Japan

[21] Appl. No.: 459,166

[22] Filed: Jun. 2, 1995

[30] Foreign Application Priority Data

Jul. 29, 1994 [JP] Japan .................................. 6-178300

[51] Int. Cl.$^6$ ....................... H01M 10/38; H01M 10/36; H01M 10/40
[52] U.S. Cl. ..................... 429/218; 429/232; 427/215; 423/406; 423/448; 423/460; 29/623.5
[58] Field of Search .................... 429/218, 232; 427/215; 423/406, 448, 460; 29/623.5

[56] References Cited

U.S. PATENT DOCUMENTS 4,939,049  7/1990  Ishibashi et al. ...................... 429/194
5,432,029  7/1995  Mitate et al. .......................... 429/194

FOREIGN PATENT DOCUMENTS

4-184863   7/1992  Japan .
4-259764   9/1992  Japan .
5-21065    1/1993  Japan .
5-258773  10/1993  Japan .

*Primary Examiner*—Stephen Kalafut
*Assistant Examiner*—Richard H. Lilley, Jr.
*Attorney, Agent, or Firm*—Nixon & Vanderhye

[57] ABSTRACT

A method of manufacturing a negative electrode for a lithium secondary battery includes the steps of mixing graphite particles as a main constituent that generates intercalation and de-intercalation of lithium ions with a compound including copper ions, obtaining graphite composite powder having copper oxide particles formed at least on a part of the surface of at least a part of the graphite particles by chemical reaction of the copper ions, and mixing the graphite composite powder with a binding material.

12 Claims, 3 Drawing Sheets

FIG. 4

METHOD OF MANUFACTURING A NEGATIVE ELECTRODE FOR LITHIUM SECONDARY BATTERY

BACKGROUND OF THE INVENTION

1. Field of the Invention

The present invention relates to a lithium secondary battery, and more particularly, to a method of manufacturing a negative electrode including graphite particles which can cause intercalation and de-intercalation of lithium ions.

2. Description of the Related Art

Secondary batteries using alkali metal such as lithium have attracted a lot of research efforts to comply with reduction in the size and power consumption of electronic equipments. The usage of alkali metal alone such as lithium for a negative electrode yields a problem that short circuit occurs within the battery by repeating operations of charge/discharge. Repetition of charge/discharge means that dissolution and precipitation of the alkali metal are effected repeatedly to result in growth of alkali metal dendrite on the surface of the negative electrode. This dendrite may become so great that it penetrates the separator between the negative electrode and the positive electrode to come into contact with the positive electrode, resulting in a short circuit.

The growth of dendrite can be suppressed to improve the charge/discharge cycle characteristics by using an alkali metal alloy as the negative electrode for a secondary battery instead of alkali metal. However, dendrite growth cannot be completely suppressed even in the case where an alkali metal alloy is used as the negative electrode. The possibility still remains of a short circuit within the battery.

Recently, a negative electrode of carbon or a conductive organic polymer material has been developed taking advantage of attraction and discharge of alkali metal ions instead of metal dissolution, deposition, diffusion in solid or the like carried out in the case of an alkali metal or an alloy thereof. In a negative electrode of carbon or conductive polymer material, dendrite generated in the case of a negative electrode of alkali metal or alloy thereof are not grown in principle. The problem of a short circuit caused by dendrite growth within a battery is circumvented.

Carbon is a preferable material as an electrode for a battery since it is chemically stable and can be doped with either an electron-donor element or an electron-acceptor element.

When carbon is used as an active material for a negative electrode, the amount of lithium that can be intercalated between layers of carbon is 1 lithium atom per 6 carbon atoms at maximum, i.e., $LiC_6$ is the maximum. The theoretical electric capacity just by reaction between carbon and lithium is 372 mAh/g per unit weight of carbon at this upper limit.

Carbon can take various forms such as amorphous carbon to graphite. Sizes and arrangements of hexagonal nets of carbon atoms vary depending upon the starting materials and manufacturing processes. Usage of carbon materials without graphite as the active materials for negative electrodes are disclosed in, for example, Japanese Patent Laying-Open Nos. 62-90863, 62-122066, 63-213267, 1-204361, 2-82466, 3-252053, 3-285273, and 3-289068. None of the carbon materials disclosed in these documents can achieve the above-described theoretical capacity. Even carbon materials having a relatively large charge/discharge capacity exhibit linear change of a considerable gradient in potential during de-intercalation of lithium to be insufficient for the available voltage range in an actually assembled battery. It can be said that the carbon materials disclosed in the above cited documents are not satisfactory as the material for manufacturing a negative electrode in a battery with sufficient charge/discharge capacity.

Japanese Patent Laying-Open Nos. 4-112455, 4-115457, 4-115458, 4-237971, and 5-28996 disclose usage of graphite materials as the active materials for negative electrodes. The above-described theoretical capacity is achieved by none of these graphite electrodes. They are not satisfactory for use in manufacturing a battery with high capacity.

Japanese Patent Laying-Open No. 3-216960 discloses a secondary battery that allows a large current flow and improvement in cycle life time and safety by forming a lithium layer on the surface of a porous carbon material avoiding clogging of the pores. Another Japanese Patent Laying-Open No. 4-39864 discloses a secondary battery superior in charge/discharge cycle characteristics and improved in self-discharge characteristics with a great electrode capacity by using a negative electrode having a metal that can form an alloy with lithium or an alloy including lithium permeated into the pores of a carbon material. These batteries are disadvantageous in that the manufacturing process is complicated since lithium must be treated in an inactive atmosphere, resulting in increase in the cost thereof.

Although attempts have been made to improve the battery cycle characteristics and discharge efficiency after storage at a high temperature, for example, by using a negative electrode of a carbon material coated with metal such as nickel and copper as in Japanese Patent Laying-Open No. 4-184863, significant increase in the capacity of the negative electrode could not be expected.

SUMMARY OF THE INVENTION

In view of the foregoing, an object of the present invention is to provide a method of manufacturing a graphite composite negative electrode that can realize a lithium secondary battery of high capacity and high voltage.

The method of manufacturing a negative electrode for a lithium secondary battery according to the present invention includes the steps of mixing graphite particles as a main component that can induce intercalation and de-intercalation of lithium ions with a compound containing copper ions; obtaining graphite composite particles having copper oxide particles formed at least on a partial surface of the graphite particles by chemical reaction of the copper ions; and mixing a binding material agent with the graphite composite powder.

The foregoing and other objects, features, aspects and advantages of the present invention will become more apparent from the following detailed description of the present invention when taken in conjunction with the accompanying drawings.

DETAILED DESCRIPTION OF THE INVENTION

Factors affecting the charge/discharge capacity and voltage of a battery includes parameters related to the layer of carbon particles included in an electrode, such as distance $d_{002}$ of the (002) plane and the size of a crystallite. Interplanar spacing $d_{002}$ corresponds to the interlayer distance between carbon layers. Since the electrode potential in de-intercalation of lithium approximates the potential of lithium as the crystallinity of the carbon material increases, it can be expected that a carbon negative electrode of high capacity can be obtained.

Figure 4:
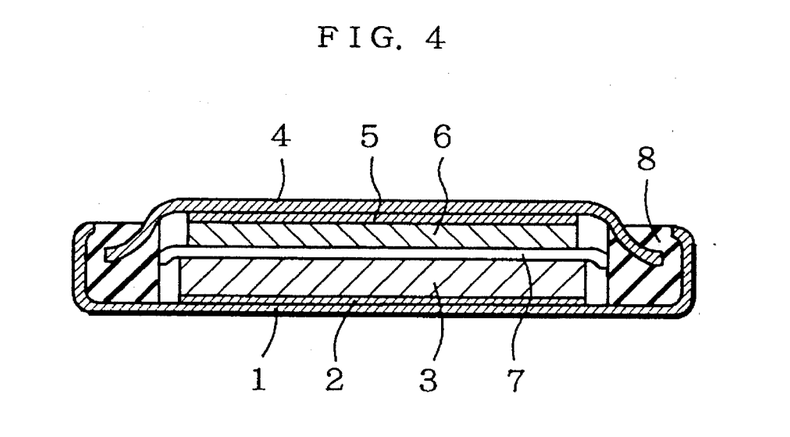
FIG. 4 is a sectional view schematically showing a lithium secondary battery according to an embodiment of the present invention.

Therefore, the average interplanar spacing $d_{002}$ of the (002) plane of graphite is preferably in the range of 0.335–0.340 nm, and La and Lc are both preferably at least 10 nm in consideration of the battery capacity that can be used in an assembled lithium secondary battery (refer to FIG. 4 and related description as to a structure thereof). When the thickness Lc of a crystallite in a direction perpendicular to the (002) plane of graphite is smaller than 10 nm, the available charge/discharge capacity in an assembled lithium secondary battery is too small for practical usage due to the poor crystallinity of carbon. Similarly, the crystallinity of carbon is inferior when the thickness La of a crystallite in a direction perpendicular to the (100) plane of graphite is less than 10 nm, so that the charge/discharge capacity available in an assembled lithium secondary battery is low.

Regarding graphite as the main active material for a negative electrode used in the present invention, the intensity ratio R of a peak appearing in the vicinity of 1580 cm$^{-1}$ based on the graphite structure to a peak appearing in the vicinity of 1360 cm$^{-1}$ based on all imperfection structure according to argon laser Raman scattering is preferably not more than 0.4. The crystallinity of carbon is low when the R value is greater than 0.4, so that the negative electrode potential in de-intercalation of lithium becomes higher than the potential of lithium. Therefore, the charge/discharge capacity available in an assembled lithium secondary battery becomes smaller.

Graphite which can be used according to the present invention includes natural graphite, Kish graphite, artificial graphite derived from petroleum coke or coal coke, or exfoliated graphite. The graphite may be in any form such as a sphere, flake, fiber, or ground. The form of a sphere, flake or ground is preferred.

When graphite particles are used to form a negative electrode, the particle size of the graphite is preferably not more than 80 μm. The particle size is obtained as having a peak in a particle size distribution produced by means of measurement based on volume. If graphite having a particle size greater than 80 μm is used, the area of contact between a graphite particle and the electrolytic solution is reduced, so that diffusion of lithium or reaction sites in the graphite particle decrease. Therefore, charge/discharge with a large current becomes difficult.

Precipitation, thermal decomposition, or evaporation oxidation can be used as a method of forming copper oxide on the surface of a graphite particle.

When a precipitation process is to be employed, salt such as copper sulfate and graphite powder are mixed. Water is added to this mixed powder to dissolve copper sulfate. The copper sulfate solution including graphite powder is added with an alkali compound of a mole ratio greater than two times that of copper ions, and then left at a predetermined temperature to be maintained for a predetermined time. As a result, copper hydroxide is generated with the surface of the graphite particle as the nucleation site. The copper hydroxide is a gel of copper oxide hydrate. Copper oxide particles are formed on the surface of graphite particles by dehydrating this copper hydroxide.

When a thermal decomposition process is used, a copper compound that decomposes at high temperature such as copper acetate is mixed with graphite powder. By heating this combined powder in a reduced pressure, copper oxide can be formed on the surface of the graphite particles by thermal decomposition.

In an evaporation oxidation process, a compound such as copper chloride that evaporates rather easily is mixed with graphite powder. The evaporated copper compound is oxidized by heating the mixed powder in an atmosphere including oxygen, whereby copper oxide is formed on the surface of the graphite particles.

From the standpoint of simplicity in the manufacturing process and economy of the manufacturing cost, the precipitation method is most preferable of the above-described methods for forming copper oxide on the surface of graphite particles.

Dehydration of the copper hydroxide formed on the surface of graphite particles is preferably carried out in an oxidizing atmosphere that promotes generation of copper oxide. Therefore, the method of dehydration in a vapor phase including air, oxygen, ozone or the like, or the method of oxidation and dehydration using hydrogen peroxide, water containing dissolved oxygen, or a salt of oxo-acid (nitrous acid, permanganic acid, chromic acid, bichromic acid, chloric acid, hypochlorous acid or the like) may be employed.

The dehydration process using air or gas such as of oxygen must be carried out at a temperature lower than the burning temperature of graphite. The burning temperature of graphite which varies depending upon the type of graphite is at least approximately 600° C. This means that the dehydration process must be carried out at a temperature below 600° C. Furthermore, it is to be noted that in the dehydration process using air or oxygen, the surface of graphite will be oxidized to generate functional groups such as carboxyl group, lactone, hydroxyl group, and carbonyl group, when the temperature is higher than 400° C. depending upon various conditions such as the type of graphite, the oxidation time period, the oxygen partial pressure, and the ratio of graphite to copper. It is therefore desirable to carry out the dehydration process of copper hydroxide on the surface of graphite particles at a temperature less than 400° C.

The preferable weight ratio of graphite to copper oxide in graphite composite particles including graphite particles and copper oxide particles is in the range of 98.5:1.5 to 55:45, more preferably in the range of 98.5:1.5 to 72:28 depending upon the type and particle size of the graphite or the attached manner of the copper oxide particles. If the ratio of oxide copper is lower than 98.5:1.5, the effect of copper oxide is lost. If the ratio is greater than 55:45, the reaction site of graphite and lithium ion in charge/discharge decreases, so that the charge/discharge capacity available in an assembled lithium secondary battery is reduced.

A negative electrode is formed by mixing a binding material into graphite composite particles including the above-described graphite particles and copper oxide particles formed at least on a part of the surface of the copper oxide particles. Fluoropolymer such as polytetrafluoroethylene, polyvinylidene fluoride; polyolefin based polymer such as polyethylene, polypropylene; or synthetic rubber can be enumerated as candidates for the binding material. It is to be noted that the material of the binding material is not limited to the above-mentioned materials. The percentage of the binding material in the mixture of graphite, copper oxide and the binding material can be set within the range of 1 wt. % to 30 wt. %. If the amount of the binding material exceeds 30 wt. %, the resistance or polarization of the electrode increases to reduce the discharge capacity. Therefore, a lithium secondary battery for practical usage cannot be produced. If the binding material is less than 1 wt. %, the binding ability is lost to increase the fall-off the active material of the electrode and degradation of the mechanical strength thereof. As a result, production of a battery becomes difficult. In order to reinforce the binding between particles in a graphite composite, the electrode is preferably thermally treated at a temperature in the vicinity of the melting point of the binding material.

In the formation of graphite composite particles, copper oxide particles precipitating from copper hydroxide grow by the dehydration process so as to cover the graphite particles. This growth of copper oxide particles stops before the graphite particles are completely covered. Therefore, the graphite composite particles are formed in a manner having a plurality of copper oxide particles adhering to at least a part of the surface of the graphite particles. Here, it is preferable that the particle size of copper oxide is smaller than that of graphite. This is because a larger particle size of copper oxide will result in reduction of the area of the reaction surface, so that the effect of copper oxide in the electrode reaction characteristics is reduced. It is also desirable that the particle size of copper oxide having a greater specific weight is smaller than that of graphite having a lower specific weight from the standpoint of the adherence between a graphite particle and a copper oxide particle. If the particle size of copper oxide is greater than that of graphite, the frequency of liberation of a copper oxide component from the electrode surface increases during repetition of the electrode reaction due to frequent charge/discharge of the battery. This is one cause of degradation in the electrode characteristics.

A current collector is necessary for collecting current from a negative electrode. A metal foil, a metal mesh, a porous metal or the like may be used for the current collector. The metal used for the current collector is preferably a metal that does not easily form an alloy with lithium from the standpoint of degradation of mechanical strength in the repeating charge/discharge cycles. Particularly preferable for the current collector is iron, nickel, cobalt, copper, titanium, vanadium, chromium, manganese or an alloy thereof.

For an ion conductive medium, an organic electrolytic solution, solid polymer electrolyte, solid inorganic electrolyte, a fused salt or the like may be used. Particularly, an organic electrolytic solution is preferable.

For a solvent for the organic electrolytic solution, an ester family such as propylene carbonate, ethylene carbonate, butylene carbonate, diethylcarbonate, dimethylcarbonate, methylethylcarbonate, and γ-butylolactone; an ether family such as substituent tetrahydrofuran such as tetrahydrofuran and 2-methyltetrahydrofuran, dioxolane, diethyl ether, dimethoxyethane, diethoxyethane, and methoxyethoxy ethane; dimethyl sulfoxide; sulfolane; methylsulfolane; acetonitrile; methyl formate; methyl acetate or the like can be enumerated, and a mixture of one or more types of these are used as a solvent.

Listed as an electrolyte is a lithium salt such as lithium perchlorate, lithium borofluoride, lithium phosphofluoride, lithium arsenic hexa-fluoride, lithium trifluoromethanesulfonate, halogenated lithium, and lithium chloroaluminate, and a mixture of at least one or more types of these may be used. An electrolytic solution can be prepared by dissolving the electrolyte described above in the solvent as described above. It is to be noted that the solvent and electrolyte are not limited to those described above. However, the organic electrolytic solution containing ethylene carbonate is particularly preferable for its stability in the presence of graphite powder.

For a positive electrode in the lithium secondary battery according to the present invention, oxide containing $LiCoO_2$, $LiNiO_2$, $Li_xM_yT_zO_2$ (M represents one of Fe, Co, Ni, and T represents a transition metal, or a metal of 4B or 5B family), $LiMn_2O_4$ and $LiMn_{2-x}T_yO_4$ may be used as an active material for the positive electrode. The positive electrode may be formed by mixing a conductive material and a binding material into the active material, and if desired, by further adding a solid electrolyte. The mixing ratio can be set here, as 5 to 50 weight parts of the conductive material and 1 to 30 weight parts of the binding material for 100 weight parts of the active material. As for the conductive material, carbon black (acetylene black, thermal black, channel black, etc.), graphite powder, metal powder or the like may be used. For the binding material, fluoropolymer such as polytetrafluoroethylene and polyvinylidene fluoride or polyolefin based polymer such as polypropylene polyethylene, and synthetic rubber may be used. It is to be noted that the materials are not limited to those described above.

If the conductive material is less than 5 weight parts or if the binding material is more than 30 weight parts, the resistance and polarization of the positive electrode increase to reduce discharge capacity. Therefore, a lithium secondary battery for practical usage cannot be fabricated. Although the preferable ratio of a conductive material depends on the type thereof, the active material contained in the positive electrode decreases if the conductive material contained is more than 50 weight parts, whereby the discharge capacity of the positive electrode is reduced. If the binding material contained is less than 1 weight part, the binding ability drastically drops. In contrast, if the binding material is more than 30 weight parts, the active material in the positive electrode decreases and the resistance and polarization of the positive electrode increase, whereby the discharge capacity of the positive electrode becomes too small for practical usage. Note that in the manufacture of a positive electrode, thermal treatment is preferably performed at a temperature in the vicinity of the melting point of the used binding material in order to reinforce the binding between particles within the positive electrode.

It is considered that high charge/discharge capacity is obtained in the negative electrode of the lithium secondary battery according to the present invention due to increase in capacity as a result of formation of a composite oxide of lithium and copper reversible advancing as well as promotion of reaction between lithium and graphite by the influence of the composite oxide.

Furthermore, electrical resistance in accordance with contact between particles is reduced since the contact between a graphite particle and a copper oxide particle is great. Accordingly, the electrode reaction of copper oxide is improved.

Figure 1:
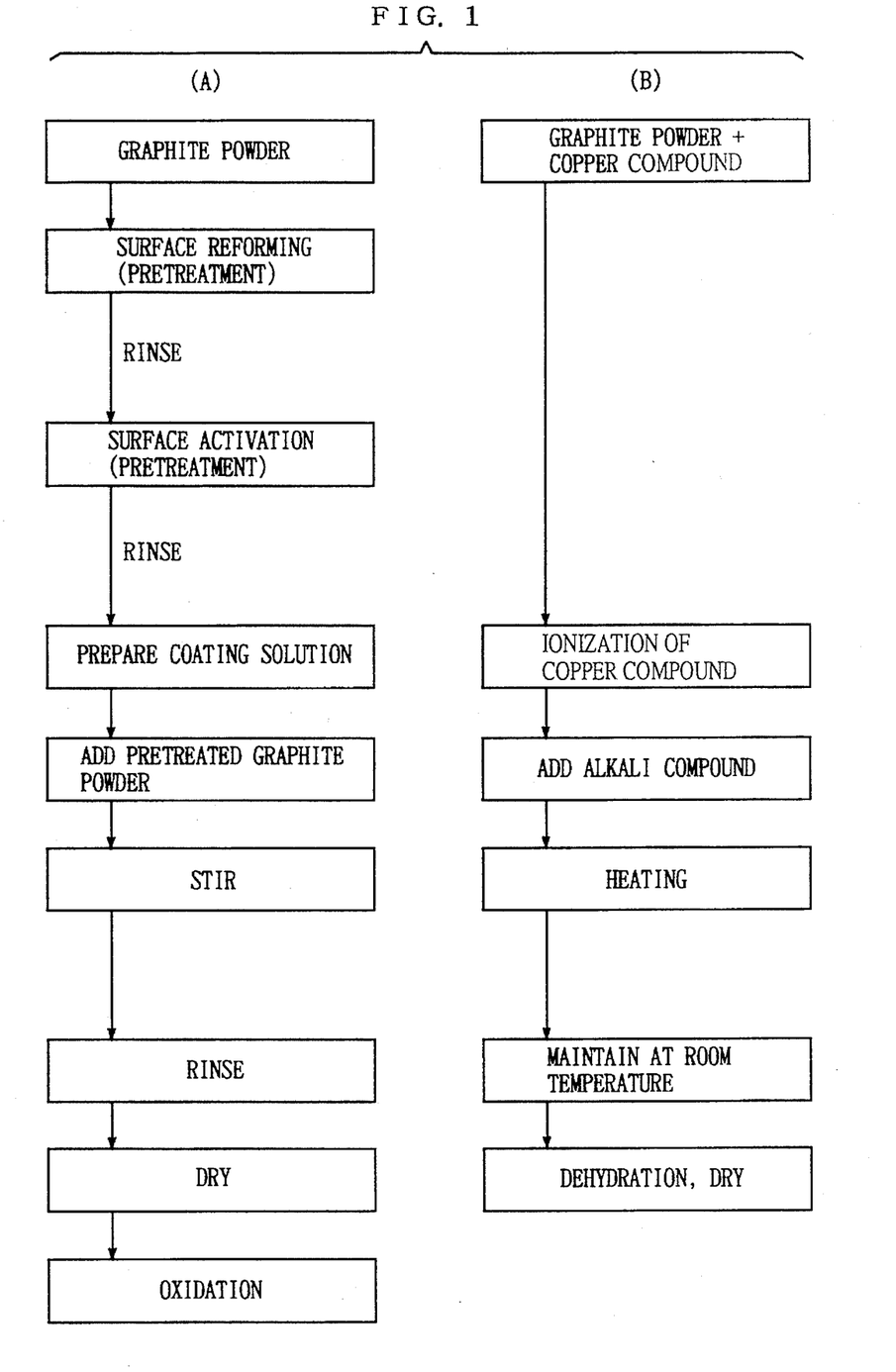
FIG. 1 is a flow diagram showing the comparison of plating and precipitation for fabricating graphite composite particles.

FIG. 1 is a flow chart of a precipitation method and a plating method for manufacturing graphite composite particles. It is appreciated from (A) showing a coating method that a surface reforming process and a surface activation process must be carried out on the graphite powder prior to electroless plating. Furthermore, since metal copper is formed on the surface of the graphite particles by the plating process, an oxidation process must additionally be carried out with respect to the metal copper. In contrast, the precipitation method shown in (B) does not require the surface reforming process or the surface activation process. Furthermore, a separate oxidation process is not required since the copper hydroxide formed on the surface of the graphite particles can be converted into copper oxide by the dehydration and drying process. According to the precipitation process of the present invention, graphite composite particles can be manufactured with a more simple and fewer number of steps at low cost in comparison with the plating method. The precipitation method is also advantageous in that a smaller processing device (particularly a small reaction bath) can be used in contrast to the plating method.

DESCRIPTION OF THE PREFERRED EMBODIMENTS

Various embodiments of the present invention will be described hereinafter. Lc and La representing the size of a crystallite are measured by the well known wide angle X-ray diffraction method. K=0.9 is used as the form factor for obtaining the size of a crystallite. The particle size is measured by a laser diffraction particle size analyzer MODEL SALD-1100 (SHIMADZU CORPORATION) having a peak in a particle distribution.

EMBODIMENT 1

Manufacture of Negative Electrode

Natural graphite particles from Madagascar (flake, particle size of 11 μm, $d_{002}$=0.337 nm, Lc=27 nm, La=17 nm, R=0, specific surface area of 8 m$^2$/g) was used as the main active material for a negative electrode.

First, 120 weight parts of natural graphite powder and 97 weight parts of copper (II) sulfate ($CuSO_4.5H_2O$) (mole ratio of 100:3.88) were mixed in a beaker. Then, 163 weight parts of lithium hydroxide ($LiOH.H_2O$) were added (10 times the mole ratio with respect to $Cu^{2+}$) to be mixed. Ion-exchange water of 1000 ml was applied into the beaker to be stirred, whereby $CuSO_4.5H_2O$ and $LiOH.H_2O$ were dissolved. This beaker was heated for 20 hours on a hot plate maintained at the temperature of 90° C. Ion-exchange water was appropriately supplied to compensate for the evaporating water during this heating step. The beaker was left for 12 hours at a room temperature of approximately 20° C. after the heating step.

The liquid constituent in the beaker was suction-filtered using a glass separator having a pore diameter of 1 μm. Suction-filtering was carried out until the filtrate became neutral while the precipitant in the beaker were rinsed. The solid obtained after filtering was dried under vacuum at 85° C. to prevent oxidation of the graphite particles, and then ground into powder. Thus, graphite composite powder was obtained having copper oxide particles formed at least on a part of the surface of the graphite particles. The weight ratio of graphite to copper oxide was 79.6:20.4. It was found that the graphite composite powder consists of graphite and copper (II) oxide CuO according to wide angle X-ray diffraction measurement.

A nonionic dispersing agent and a polytetrafluoroethylene-dispersed solution were added to the graphite composite powder and formed into paste for application on both surfaces of a copper foil current collector. (The ratio of the total weight of graphite composite powder to polytetrafluoroethylene was 87:13 after being dried.) The paste-applied current collector was dried at 60° C., heat-treated at 240° C. in vacuum or nitrogen gas, cooled down to room temperature, pressed, and then dried under reduced pressure at 200° C. to remove water. The obtained negative electrode had a surface area of 8 cm$^2$ and a thickness of 74 μm. (The thickness of the current collector included in the negative electrode was 50 μm in all the following embodiments and comparative examples.).

Evaluation of Negative Electrode

Figure 2:
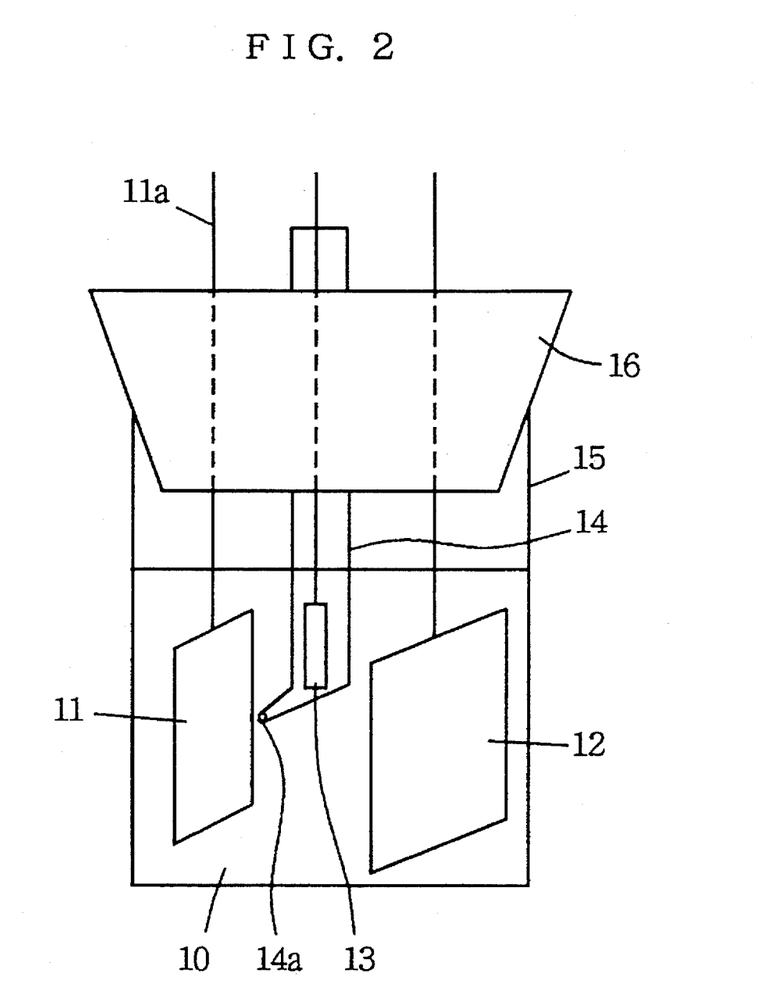
FIG. 2 is a diagram schematically showing the three-electrode method for evaluating a test electrode.

The negative electrode obtained as described above was evaluated with the three-electrode method as illustrated in FIG. 2. In FIG. 2, an electrolytic solution 10 was kept in a container 15 having a cap 16. Electrolytic solution 10 was prepared by dissolving 1 mol/l lithium perchlorate in a solvent of ethylene carbonate and diethyl carbonate mixed in the ratio of 1:1. A negative electrode 11 to be evaluated and an opposite lithium electrode 12 were placed in electrolytic solution 10 with a predetermined distance therebetween. A lithium reference electrode 13 housed in a Luggin tube 14 was placed between test electrode 11 and opposite electrode 12. Luggin tube 14 has a lower end portion tapered toward test electrode 11. The lower end portion had an opening 14a at its tip. More specifically, electrolytic solution 10 was introduced into the Luggin tube through opening 14a. Reference electrode 13 was also immersed in electrolytic solution 10. The negative electrode was evaluated by conducting a current flow from the copper current collector through a lead 11a.

In a charge/discharge test, charging was performed at a current density of 0.1 mA/cm$^2$ between test electrode 11 and opposite electrode 12. The charging operation was continued until the voltage of test electrode 11 relative to reference electrode 10 reached 0 V. Then, at the same current density, discharging was performed until the voltage of the test electrode relative to reference electrode 13 reached 1.5 V. The charging/discharging operation was repeated in the same potential range and at the same current density similarly from the second cycle onward. Then, evaluation of the negative electrode was carried out on the basis of discharge capacity. As a result, the discharge capacity was 456 mAh per unit volume of electrode (excluding the volume of current collector; the same applies hereinafter) at the second cycle, and 420 mAh at the tenth cycle.

EMBODIMENT 2

As graphite particles, denatured graphite (flake, particle size 8 μm, $d_{002}$=0.337 nm, Lc=17 nm, La=12 nm, R=0.1, specific surface area 9 m$^2$/g) was used. 120 weight parts of denatured graphite powder and 66.7 weight parts of copper acetate hydrate ($Cu(CH_3COO)_2.5H_2O$) were mixed in a beaker (mole ratio of 200:3.3). 140 weight parts of lithium hydroxide ($LiOH.H_2O$) was added into the beaker (10 times the mole ratio with respect to $Cu^{2+}$) to be mixed. Then, 2000 ml of ion-exchange water was added into the beaker to be stirred, whereby $Cu(CH_3COO)_2.H_2O$ and $LiOH.H_2O$ were dissolved. The beaker was heated for 20 hours on a hot plate maintained at the temperature of 90° C. Ion-exchange water was appropriately supplied to compensate for the evaporated water during the heating step. The beaker was left at a room temperature of approximately 20° C. for 12 hours after the heating step.

The fluid constituent in the beaker was suction-filtered using a glass separator having a pore diameter of 1 μm. This suction-filtering was carried out while rinsing the precipitant in the beaker until the filtrate became neutral. The solid obtained by filtering was dried under vacuum at 85° C. to prevent oxidation of the graphite particles, and then ground to powder. This graphite composite powder has copper oxide particles formed at least partially on the surface of the graphite particles. The weight ratio of graphite to copper oxide was 82:18. It was found that the graphite composite powder consists of graphite and copper (II) oxide CuO according to measurement by the wide angle X-ray diffraction method. A negative electrode was fabricated according to a method similar to that of Embodiment 1 using this graphite composite powder. The obtained negative electrode had a surface area of 8 cm$^2$ and a thickness of 71 μm.

The negative electrode of Embodiment 2 was evaluated in a manner similar to that of Embodiment 1. The discharge capacity at the second cycle was 459 mAh per unit volume of electrode, and the discharge capacity at the tenth cycle was 433 mAh.

EMBODIMENT 3

As graphite particles, denatured graphite (flake, particle size 17 μm, $d_{002}$=0.337 nm, Lc=22 nm, La=15 nm, R=0.1, specific surface area 9 m$^2$/g) was used. 120 weight parts of denatured graphite powder and 46.7 weight parts of copper (II) sulfate ($CuSO_4.5H_2O$) were mixed in a beaker (mole ratio of 200:1.87). 157 weight parts of lithium hydroxide ($LiOH.H_2O$ was added into the beaker (20 times the mole ratio with respect to $Cu^{2+}$) to be mixed. Then, 2000 ml of ion-exchange water was added into the beaker to be stirred, whereby $CuSO_4.5H_2O$ and $LiOH.H_2O$ were dissolved. The beaker was heated for 20 hours on a hot plate maintained at the temperature of 90° C. Ion-exchange water was appropriately supplied to compensate for the evaporated water during the heating step. The beaker was left at a room temperature of approximately 20° C. for 12 hours after the heating step.

The fluid constituent in the beaker was suction-filtered using a glass separator having a pore diameter of 1 μm. This suction-filtering was carried out while rinsing the precipitant in the beaker until the filtrate became neutral. The solid obtained by filtering was dried under vacuum at 85° C. to prevent oxidation of the graphite particles, and then ground to powder. This graphite composite powder has copper oxide particles formed at least partially on the surface of the graphite particles. The weight ratio of graphite to copper oxide was 89:11. It was found that the graphite composite powder consists of graphite and copper (II) oxide CuO according to measurement by the wide angle X-ray diffraction method. A negative electrode was fabricated according to a method similar to that of Embodiment 1 using this graphite composite powder. The negative electrode had a surface area of 8 cm$^2$ and a thickness of 89 μm.

The negative electrode of Embodiment 3 was evaluated in the manner similar to that of Embodiment 1. The discharge capacity at the second cycle was 440 mAh per unit volume of electrode, and the discharge capacity at the tenth cycle was 414 mAh.

EMBODIMENT 4

As graphite particles, artificial graphite (flake, particle size 35 μm, $d_{002}$=0.336 nm, Lc=22 nm, La=13 nm, R=0, specific surface area 4 m$^2$/g) was used. 120 weight parts of artificial graphite powder and 58.4 weight parts of copper (II) sulfate ($CuSO_4.5H_2O$) were mixed in a beaker (mole ratio of 200:4.67). 98 weight parts of lithium hydroxide ($LiOH.H_2O$) was added into the beaker (10 times the mole ratio with respect to $Cu^{2+}$) to be mixed. Then, 2000 ml of ion-exchange water was added into the beaker to be stirred, whereby $CuSO_4.5H_2O$ and $LiOH.H_2O$ were dissolved. The beaker was heated for 20 hours on a hot plate maintained at the temperature of 90° C. Ion-exchange water was appropriately supplied to compensate for the evaporated water during the heating step. The beaker was left at a room temperature of approximately 20° C. for 12 hours after the heating step.

The fluid constituent in the beaker was suction-filtered using a glass separator having a pore diameter of 1 μm. This suction-filtering was carried out while rinsing the precipitant in the beaker until the filtrate became neutral. The solid obtained by filtering was dried under vacuum at 85° C. to prevent oxidation of the graphite particles, and then ground to powder. This graphite composite powder has copper oxide particles formed at least partially on the surface of the graphite particles. The weight ratio of graphite to copper oxide was 86.6:13.4. It was found that the graphite composite powder consists of graphite and copper (II) oxide CuO according to measurement by the wide angle X-ray diffraction method. A negative electrode was fabricated according to a method similar to that of Embodiment 1 using this graphite composite powder. The negative electrode had a surface area of 8 cm$^2$ and a thickness of 130 μm.

The negative electrode of Embodiment 4 was evaluated in a manner similar to that of Embodiment 1. The discharge capacity at the second cycle was 400 mAh per unit volume of electrode, and the discharge capacity at the tenth cycle was 385 mAh.

EMBODIMENT 5

As graphite particles, artificial graphite (flake, particle size 6 μm, $d_{002}$=0.339 nm, Lc=25 nm, La=13 nm, R=0.4, specific surface area 8 m$^2$/g) was used. 120 grams of artificial graphite powder and 19.7 grams of copper (II) sulfate ($CuSO_4.5H_2O$) were mixed in a beaker (mole ratio of 100:0.79). 600 ml of 28% ammonia water was added into the beaker (10 times the mole ratio with respect to $Cu^{2+}$) to be mixed. Then, 1400 ml of ion-exchange water was added into the beaker to be stirred, whereby $CuSO_4.5H_2O$ was dissolved. The beaker was heated for 10 hours on a hot plate maintained at the temperature of 70° C. Ion-exchange water was appropriately supplied to compensate for the evaporated water during the heating step. The beaker was left at a room temperature of approximately 20° C. for 12 hours after the heating step.

The fluid constituent in the beaker was suction-filtered using a glass separator having a pore diameter of 1 μm. This suction-filtering was carried out while rinsing the precipitant in the beaker until the filtrate became neutral. The solid obtained by filtering was dried under vacuum at 85° C. to prevent oxidation of the graphite particles, and then ground to powder. This graphite composite powder has copper oxide particles formed at least partially on the surface of the graphite particles. The weight ratio of graphite to copper oxide was 95:5. It was found that the graphite composite powder consists of graphite and copper (II) oxide CuO according to measurement by the wide angle X-ray diffraction method. A negative electrode was fabricated according to a method similar to that of Embodiment 1 using this graphite composite powder. The negative electrode had a surface area of 8 cm$^2$ and a thickness of 70 μm.

The negative electrode of Embodiment 5 was evaluated according to a method similar to that of Embodiment 1, provided that a solution prepared by dissolving 1 mol/l perchlorate in a solvent of ethylene carbonate, propylene carbonate and diethyl carbonate, mixed in the ratio of 2:1:2, was used as the electrolytic solution. The discharge capacity at the second cycle was 421 mAh per unit volume of electrode, and the discharge capacity at the tenth cycle was 395 mAh.

EMBODIMENT 6

As graphite particles, artificial graphite identical to that of Embodiment 5 was used. 120 weight parts of artificial graphite powder and 19.7 weight parts of copper (II) sulfate $CuSO_4.5H_2O$ were mixed in a beaker (mole ratio of 100:1). 95 weight parts of urea ($NH_2CONH_2$) was added into the beaker (10 times the mole ratio with respect to $Cu^{2+}$) to be mixed. Then, 2000 ml of ion-exchange water was added into the beaker to be stirred, whereby $CuSO_4.5H_2O$ and $NH_2CONH_2$ were dissolved. The beaker was heated for 20 hours on a hot plate maintained at the temperature of 90° C. Ion-exchange water was appropriately supplied to compensate for the evaporated water during the heating step. The beaker was left at a room temperature of approximately 20° C. for 12 hours after the heating step.

The fluid constituent in the beaker was suction-filtered using a glass separator having a pore diameter of 1 μm. This suction-filtering was carried out while rinsing the precipitant in the beaker until the filtrate becomes neutral. The solid obtained by filtering was dried under vacuum at 85° C. to prevent oxidation of the graphite particles, and then ground to powder. This graphite composite powder has copper oxide particles formed at least partially on the surface of the graphite particles. The weight ratio of graphite to copper oxide was 95:5. It was found that the graphite composite powder consists of graphite and copper (II) oxide CuO according to measurement by the wide angle X-ray diffraction method. A negative electrode was fabricated according to a method similar to that of Embodiment 1 using this graphite composite powder. The negative electrode had a surface area of 8 cm$^2$ and a thickness of 72 μm.

The negative electrode of Embodiment 5 was evaluated according to the method similar to that of Embodiment 1, provided that a solution prepared by dissolving 1 mol/l perchlorate in a solvent of ethylene carbonate, propylene carbonate and diethyl carbonate, mixed in the ratio of 2:1:2, was used as the electrolytic solution. The discharge capacity at the second cycle was 424 mAh per unit volume of electrode, and the discharge capacity at the tenth cycle was 396 mAh.

Comparative Example 1

As graphite particles, natural graphite from Madagascar similar to that of Embodiment 1 was used. The natural graphite powder was immersed in ethyl alcohol, dried, immersed in a sensitizing agent (a mixture solution of 30 g/l $SnCl_2.2H_2O$ and 20 ml/l concentrated hydrochloric acid), and then immersed in an activating agent (a mixture solution of 0.4 g/l $PdCl_2.2H_2O$ and 3 ml/l concentrated hydrochloric acid) for pretreatment. The pretreated graphite powder was placed in an electroless plating bath in which a solution containing 10 g/l $CuSO_4.5H_2O$, 50 g/l potassium sodium tartrate, 10 g/l sodium hydroxide, and 10 ml/l of 37% formalin were prepared into pH=12.0 with sodium hydroxide. The plating solution was stirred with a stirrer at room temperature to apply copper plating on the graphite powder. The copper-plated graphite powder was dried at 60° C. The weight ratio of graphite to copper was 83:17. Oxidation of the copper-plated graphite powder was carried out for five hours at 250° C. in air, whereby graphite composite powder including graphite particles and copper oxide formed thereon was obtained. It was observed that this graphite composite powder consists of graphite and copper (II) oxide CuO by measurement of the wide angle X-ray diffraction method. The weight ratio of graphite to copper oxide was 79.6:20.4. A negative electrode was manufactured using this graphite composite powder according to a method similar to that of Embodiment 1. The obtained negative electrode had a surface area of 8 cm$^2$ and a thickness of 75 μm.

The negative electrode of Comparative Example 1 was evaluated in a manner similar to that of Embodiment 1. The discharge capacity at the second cycle was 458 mAh per unit volume of electrode, and the discharge capacity at the tenth cycle was 421 mAh.

Comparative Example 2

Denatured graphite similar to that of Embodiment 2 was used as graphite particles. Copper-plated graphite powder was obtained according to a method similar to that of Comparative Example 1 provided that denatured graphite particles were plated in an electroless copper plating bath at 75° C. in which a solution containing 0.06 mol/l $CuSO_4.5H_2O$, 0.3 mol/l EDTA (ethylenediaminetetraacetic acid), 0.4 mol/l formaldehyde, and 170 mg/l of 7-iodo-8-hydroxyquinoline-5-sulfonic acid were prepared into pH=12.8 with sodium hydroxide. The weight ratio of graphite to copper in the copper-plated graphite powder was 85:15. Graphite composite powder having copper oxide formed on the surface of graphite particles was obtained by oxidizing the copper-plated graphite powder for 30 minutes at 400° C. in air. It was observed that the graphite composite powder consists of graphite and copper (II) oxide CuO according to measurement by the wide angle X-ray diffraction method. The weight ratio of graphite to copper oxide was 82:18. A negative electrode was manufactured according to a method similar to that of Embodiment 1 using this graphite composite powder. The obtained negative electrode had a surface area of 8 cm$^2$ and a thickness of 71 μm.

The negative electrode of Comparative Example 2 was evaluated in a manner similar to that of Embodiment 1. The discharge capacity at the second cycle was 462 mAh per unit volume of electrode, and the discharged capacity at the tenth cycle was 435 mAh.

Comparative Example 3

Denatured graphite identical to that of Embodiment 3 was used as graphite particles. Copper-plated graphite powder was obtained according to a method similar to that of Comparative Example 1 provided that the denatured graphite particle was plated in an electroless copper plating bath in which a solution containing 15 g/l $Cu(NO_3)_2.3H_2O$, 10 g/l sodium hydrogen carbonate, 30 g/l potassium sodium tartrate, 20 g/l sodium hydroxide and 100 ml/l of 37% formalin was prepared into pH=11.5 with sodium hydroxide.

The weight ratio of graphite to copper in the copper-plated graphite powder was 91:9. Graphite composite powder was obtained including graphite particles and copper oxide formed on the surface thereof by oxidizing the copper-plated graphite powder for 24 hours at 200° C. in oxygen. It was observed that the obtained graphite composite powder consists of graphite and copper (II) oxide CuO according to measurement by wide angle X-ray diffraction. The weight ratio of graphite to copper oxide was 89:11. A negative electrode was manufactured according to a method similar to that of Embodiment 1 using this graphite composite powder. The obtained negative electrode had a surface area of 8 cm$^2$ and a thickness of 88 μm.

The negative electrode of Comparison Example 3 was evaluated in a manner similar to that of Embodiment 1. The discharge capacity at the second cycle was 439 mAh per unit volume of electrode, and the discharge capacity at the tenth cycle was 415 mAh.

Comparative Example 4

Artificial graphite similar to that of Embodiment 4 was used as graphite particles. Copper-plated graphite powder was obtained according to a method similar to that of Comparative Example 1 provided that the artificial graphite particles were plated in an electroless copper plating bath obtained by mixing a solution containing 60 g/l CuSO$_4$.5H$_2$O, 15 g/l NiSO$_4$.7H$_2$O and 45 g/l hydrazine sulfate, with a solution containing 180 g/l potassium sodium tartrate, 45 g/l sodium hydroxide, and 15 g/l sodium carbonate, immediately before use. The weight ratio of graphite and copper in the copper-plated graphite powder was 89:11. Graphite composite powder including graphite particles and copper oxide formed on their surface was manufactured by oxidizing the copper-plated graphite powder for 1 hour at 350° C. in air. The obtain graphite composite powder consists of graphite and copper (II) oxide CuO according to measurement by wide angle X-ray diffraction. The weight ratio of graphite to copper oxide was 86.6:13.4. A negative electrode was manufactured according to a method similar to that of Embodiment 1 using this graphite composite powder. The obtained negative electrode had a surface area of 8 cm$^2$ and a thickness of 132 μm.

The negative electrode of Comparative Example 4 was evaluated in a manner similar to that of Embodiment 1. The discharge capacity at the second cycle was 402 mAh per unit volume of electrode, and the discharge capacity at the tenth cycle was 388 mAh.

Comparative Example 5

Artificial graphite similar to that of Embodiment 5 was used as graphite particles. The artificial graphite particles were pretreated with MAC-100 and MAC-200 (manufactured by OKUNO CHEMICAL INDUSTRIES CO., LTD.) and plated in an electroless copper plating bath using two kinds of solutions, MAC-500A and MAC-500B (manufactured by OKUNO CHEMICAL INDUSTRIES CO., LTD.). The weight ratio of graphite and copper in the copper-plated graphite powder was 96:4. The copper-plated graphite powder was oxidized for 15 hours at 70° C. in water containing dissolved oxygen, whereby graphite composite powder including graphite particles and copper oxide formed thereon was produced. It was observed that the obtained graphite composite powder consists of graphite, copper (I) oxide Cu$_2$O and copper (II) oxide CuO according to measurement by wide angle X-ray diffraction. The weight ratio of graphite to copper oxide was 95.2:4.8. A negative electrode was manufactured using this graphite composite powder according to a method similar to that of Embodiment 1. The obtained negative electrode had a surface area of 8 cm$^2$ and a thickness of 71 μm.

The negative electrode of Comparative Example 5 was evaluated in a manner similar to that of Embodiment 1 provided that the electrolytic solution was prepared by dissolving 1 mol/l lithium perchlorate in a mixture solvent containing ethylene carbonate, propylene carbonate, and diethyl carbonate in the ratio of 2:1:2. The discharge capacity at the second cycle was 425 mAh per unit volume of electrode, and the discharge capacity at the tenth cycle was 398 mAh.

The results of the above-described Embodiments 1–6 and Comparative Examples 1–5 are shown in the following Table 1. It is appreciated from Table 1 that a negative electrode including graphite composite powder obtained by precipitation has a high discharge capacity substantially equal to that of a negative electrode including graphite composite powder obtained by plating. It is understood that at least the two steps of surface reforming process and surface activation process of graphite particles can be eliminated in the precipitation method according to the present invention in comparison with that of the plating method. Therefore, the manufacturing process of a negative electrode can be simplified.

TABLE 1

|  | Discharge Capacity at Second Cycle | Discharge Capacity at Tenth Cycle | Carbon Particle size |
| --- | --- | --- | --- |
| Embodiment 1 | 456 mAh/cm$^3$ | 420 mAh/cm$^3$ | 11 μm |
| Embodiment 2 | 459 mAh/cm$^3$ | 433 mAh/cm$^3$ | 8 μm |
| Embodiment 3 | 440 mAh/cm$^3$ | 414 mAh/cm$^3$ | 17 μm |
| Embodiment 4 | 400 mAh/cm$^3$ | 385 mAh/cm$^3$ | 35 μm |
| Embodiment 5 | 428 mAh/cm$^3$ | 398 mAh/cm$^3$ | 6 μm |
| Embodiment 6 | 424 mAh/cm$^3$ | 396 mAh/cm$^3$ | 6 μm |
| Embodiment 7 | 370 mAh/cm$^3$ | 349 mAh/cm$^3$ | 77 μm |
| Comparative Example 1 | 458 mAh/cm$^3$ | 421 mAh/cm$^3$ | 11 μm |
| Comparative Example 2 | 462 mAh/cm$^3$ | 435 mAh/cm$^3$ | 8 μm |
| Comparative Example 3 | 439 mAh/cm$^3$ | 415 mAh/cm$^3$ | 17 μm |
| Comparative Example 4 | 402 mAh/cm$^3$ | 388 mAh/cm$^3$ | 35 μm |
| Comparative Example 5 | 425 mAh/cm$^3$ | 398 mAh/cm$^3$ | 6 μm |
| Comparative Example 6 | 358 mAh/cm$^3$ | 344 mAh/cm$^3$ | 11 μm |
| Comparative Example 7 | 371 mAh/cm$^3$ | 335 mAh/cm$^3$ | 11 μm |
| Comparative Example 8 | 176 mAh/cm$^3$ | 159 mAh/cm$^3$ | 6 μm |
| Comparative Example 9 | 361 mAh/cm$^3$ | 337 mAh/cm$^3$ | 117 μm |

Comparative Example 6

A negative electrode was manufactured according to a method similar to that of Embodiment 1 using only natural graphite from Madagascar similar to that of Embodiment 1. More specifically, copper oxide was not formed on the surface of the graphite particles in the present electrode. The obtained negative electrode had a surface area of 8 cm$^2$ and a thickness of 85 μm.

The negative electrode of Comparative Example 6 was evaluated according to a manner similar to that of Embodiment 1 provided that the current density was 30 mA/g. The discharge capacity at the second cycle was 358 mAh per unit volume of electrode, and the discharge capacity at the tenth cycle was 344 mAh.

Comparative Example 7

Natural graphite particles from Madagascar similar to that of Embodiment 1 was used as the main active material of a negative electrode. The natural graphite particles and sieved particles of commercially available copper (II) oxide (particle size 27 μm) were mixed in a mortar under the weight ratio of 80:20. A nonionic dispersing agent and a polytetrafluoroethylene-dispersed solution were added to the mixture of graphite and copper (II) oxide and formed into paste for application on both surfaces of a copper foil current collector. (The ratio of the total weight of graphite and copper (II) oxide to polytetrafluoroethylene was 87:13 after being dried.) The paste-applied current collector was dried at 60° C. heat-treated at 240° C., pressed, and then dried under reduced pressure at 200° C. to remove water. This obtained negative electrode had a surface area of 8 cm$^2$ and a thickness of 138 μm.

The negative electrode of Comparative Example 7 was evaluated in a manner similar to that of Embodiment 1. The discharge capacity at the second cycle was 371 mAh per unit volume of electrode, and the discharge capacity at the tenth cycle was 335 mAh.

Comparative Example 8

Methocarbon micro beads carbonated at 1000° C. (sphere, particle size 6 μm, $d_{002}$=0.349 nm, Lc=1.3 nm, La (unable to measure), R=1.3, specific surface area=1 m$^2$/g) were used as carbon particles. The carbon particles were pretreated with MAC-100 and MAC-200, and plated in an electroless copper plating bath using two kinds of solutions, MAC-500A and MAC-500B. The weight ratio of carbon to copper in the copper-plated graphite powder was 81:19. The copper-plated carbon powder was further oxidized in a manner similar to that of Comparative Example 1, whereby carbon composite powder including carbon particles and copper oxide formed on the surface thereof was produced. It was observed that the obtained carbon composite powder consists of carbon and copper (II) oxide CuO according to measurement by wide angle X-ray diffraction. The weight ratio of carbon to copper oxide was 77.3:22.7. A negative electrode was manufactured according to a method similar to that of Embodiment 1 using this carbon composite powder. The obtained negative electrode had a surface area of 8 cm$^2$ and a thickness of 68 μm.

The negative electrode of Comparative Example 8 was evaluated in a manner similar to that of Embodiment 1. The discharge capacity at the second cycle was 176 mAh per unit volume of electrode, and the discharge capacity at the tenth cycle was 159 mAh.

The results of Comparative Examples 6–8 are also shown in Table 1. It is appreciated by comparing Embodiments 1–6 with Comparative Examples 6–8 in Table 1 that high discharge capacity is obtained in Embodiments 16 in comparison with that of Comparative Examples 6–8. It is particularly appreciated that the discharge capacity is low in Comparative Example 8 where graphite particles are not included in the carbon particles.

EMBODIMENT 7

Artificial graphite (flake, particle size 77 μm, $d_{002}$=0.337 nm, Lc=26 nm, La=14 nm, R=0.1, specific surface area 2 m$^2$/g) was used as graphite particles. The artificial graphite powder was subjected to a method similar to that of Embodiment 1 provided that the mixing ratio of the chemical ingredients were slightly modified. The obtained graphite composite powder was observed to consist of graphite and copper (II) oxide CuO according to measurement by wide angle X-ray diffraction. The weight ratio of graphite to copper oxide was 84.3:15.7. A negative electrode was manufactured using this graphite composite powder according to a method similar to that of Embodiment 1. The obtained negative electrode had a surface area of 8 cm$^2$ and a thickness of 225 μm.

The negative electrode of Embodiment 7 was evaluated in a manner similar to that of Embodiment 1 provided that a current density of 0.05 mA/cm$^2$ was used. The discharge capacity at the second cycle was 370 mAh per unit volume of electrode, and the discharge capacity at the tenth cycle was 349 mAh.

Comparative Example 9

Artificial graphite (flake, particle size 117 μm, $d_{002}$=0.337 nm, Lc=25 nm, La=17 nm, R=0.1, specific surface area 1 m$^2$/g) was used as graphite particles. The artificial graphite powder was plated according to a method similar to that of Comparative Example 5. The weight ratio of graphite to copper in the obtained copper-plated graphite powder was 88:12.

The copper-plated graphite powder was oxidized according to a method similar to that of Comparative Example 1, whereby graphite composite powder including graphite particles and copper oxide formed on the surface thereof was produced. The obtained graphite composite powder consisted of graphite and copper (II) oxide CuO according to measurement by wide angle X-ray diffraction. The weight ratio of graphite to copper oxide was 85.4:14.6. A negative electrode was manufactured according to a method similar to that of Embodiment 1 using this graphite composite powder. The obtained negative electrode had a surface area of 8 cm$^2$ and a thickness of 305 μm.

The negative electrode of Comparative Example 9 was evaluated in a manner similar to that of Embodiment 1 provided that a current density of 0.05 mA/cm$^2$ was used. The discharge capacity at the second cycle was 361 mAh per unit volume of electrode, and the discharge capacity at the tenth cycle was 337 mAh.

The results of Embodiment 7 and Comparative Example 9 are also shown in Table 1. It is appreciated from the comparison of Embodiments 1–7 with Comparative Example 9 that the graphite particle in the negative electrode preferably has a particle size not more than 80 μm.

EMBODIMENT 8

Natural graphite from Madagascar identical to that of Embodiment 1 was used as the graphite particles. The graphite composite powder was produced in a manner similar to that of Embodiment 4 using the natural graphite powder. The obtained graphite composite powder consisted of graphite and copper (II) oxide CuO according to measurement by wide angle X-ray diffraction. The weight ratio of graphite to copper oxide was 86.6:13.4.

A nonionic dispersing agent and a polytetrafluoroethylene-dispersed solution were added to the graphite composite powder and formed into paste for application onto both surfaces of a copper foil current collector. (The ratio of the graphite composite powder to polytetrafluoroethylene was 77:23). The paste-applied current collector was dried at 60°

C., heat-treated at 240° C. under vacuum or in nitrogen gas, pressed at room temperature, and then dried under reduced pressure at 200° C. to remove water. This obtained negative electrode had a surface area of 8 cm² and a thickness of 83 μm.

The negative electrode of Embodiment 8 was evaluated in a manner similar to that of Embodiment 1. The discharge capacity at the second cycle was 386 mAh per unit volume of electrode, and the discharge capacity at the tenth cycle was 358 mAh.

Comparative Example 10

Graphite composite powder was obtained according to a method similar to that of Embodiment 8. A negative electrode was manufactured according to a method similar to that of Embodiment 8 provided that the weight ratio of the graphite composite powder to polytetrafluoroethylene was 63.37. The obtained negative electrode had a surface area of 8 cm² and a thickness of 88 μm.

The negative electrode of Comparative Example 10 was evaluated in a manner similar to that of Embodiment 1. The discharge capacity at the second cycle was 362 mAh per unit volume of electrode, and the discharge capacity at the tenth cycle was 344 mAh.

EMBODIMENT 9

Graphite composite powder was obtained in a manner similar to that of Embodiment 8. A negative electrode was manufactured according to a method similar to that of Embodiment 8 provided that the weight ratio of the obtained graphite composite powder to polytetrafluoroethylene was 97.3. The obtained negative electrode had a surface area of 8 cm² and a thickness of 76 μm.

The negative electrode of Embodiment 9 was evaluated in a manner similar to that of Embodiment 1. The discharge capacity at the second cycle was 413 mAh per unit volume of electrode, and the discharge capacity at the tenth cycle was 350 mAh.

Comparative Example 11

Graphite composite powder was obtained in a manner similar to that of Embodiment 8. An attempt was made to manufacture a negative electrode in a manner similar to that of Embodiment 8 provided that the weight ratio of the obtained graphite composite powder to polytetrafluoroethylene was 99.5:0.5. However, the active layer including graphite composite powder was peeled off from the current collector.

The results of Embodiments 8 and 9 and Comparative Examples 10 and 11 are shown in the following Table 2 together with the results of Embodiments 1–7. It is appreciated from comparing the Embodiments and Comparative Examples shown in Table 2 that the weight ratio of the graphite composite powder to the binding material is preferably in the range of 99:1 to 70:30.

TABLE 2

| | Discharge Capacity at Second Cycle | Discharge Capacity at Tenth Cycle | Weight Ratio of Composite to Binding material |
|---|---|---|---|
| Embodiment 1 | 456 mAh/cm³ | 420 mAh/cm³ | 87:13 |
| Embodiment 2 | 459 mAh/cm³ | 433 mAh/cm³ | 87:13 |
| Embodiment 3 | 440 mAh/cm³ | 414 mAh/cm³ | 87:13 |
| Embodiment 4 | 400 mAh/cm³ | 385 mAh/cm³ | 87:13 |
| Embodiment 5 | 428 mAh/cm³ | 398 mAh/cm³ | 87:13 |
| Embodiment 6 | 424 mAh/cm³ | 396 mAh/cm³ | 87:13 |
| Embodiment 7 | 370 mAh/cm³ | 349 mAh/cm³ | 87:13 |
| Embodiment 8 | 386 mAh/cm³ | 358 mAh/cm³ | 77:23 |
| Embodiment 9 | 413 mAh/cm³ | 350 mAh/cm³ | 97:3 |
| Comparative Example 10 | 362 mAh/cm³ | 344 mAh/cm³ | 63:37 |
| Comparative Example 11 | -(peel off) | -(peel off) | 99.5:0.5 |

EMBODIMENT 10

Graphite composite powder was produced according to a method substantially similar to that of Embodiment 4 provided that artificial graphite (flake, particle size 7 μm, $d_{002}$=0.336 nm, Lc=22 nm, La=13 nm, R=0.1, specific surface area 10 m²/g) was used. The obtained graphite composite powder was observed to consist of graphite and copper (II) oxide CuO according to measurement by wide angle X-ray diffraction. The weight rate of graphite to copper oxide was 86.6:13.4.

A solution containing N, N-dimethylformamide and polyvinylidene fluoride at the weight ratio of 1.5:0.05 was added into the graphite composite powder and formed into paste. The weight ratio of the graphite composite and polyvinylidene fluoride was 91:9 after being dried. The paste was applied onto both sides of a stainless steel foil current collector, dried at 65° C., heat-treated at 155° C., pressed, and dried at 160° C. under reduced pressure to remove water, whereby a negative electrode was formed. The resulting negative electrode had a surface area of 8 cm² and a thickness of 72 μm.

The negative electrode of Comparative Example 10 was evaluated in a manner similar to that of Embodiment 1. The discharge capacity at the second cycle was 440 mAh per unit volume of electrode, and the discharge capacity at the tenth cycle was 414 mAh.

EMBODIMENT 11

Denatured graphite (flake, particle size 7 μm, $d_{002}$=0.336 nm, Lc=22 nm, La=13 nm, R=0.1, specific surface area 10 m²/g) was used as graphite particles. Graphite composite powder was fabricated according to a method similar to that of Embodiment 1 provided that 120 weight parts of graphite powder, 9.3 weight parts of copper (II) sulfate, 15.5 weight parts of lithium hydroxide, and 2000 ml of ion exchange-water were used. The obtained graphite composite powder consisted of graphite and copper (II) oxide CuO according to measurement by wide angle X-ray diffraction. The weight ratio of graphite to copper oxide was 97.6:2.4. A negative electrode was manufactured according to a method substantially similar to that of Embodiment 1 using the graphite composite powder. The obtained negative electrode had a surface area of 8 cm² and a thickness of 70 μm.

The negative electrode of Embodiment 11 was evaluated in a manner similar to that of Embodiment 1. The discharge capacity at the second cycle was 396 mAh per unit volume of electrode, and the discharge capacity at the tenth cycle was 372 mAh.

EMBODIMENT 12

Graphite composite powder was fabricated according to a method substantially equal to that of Embodiment 11 provided that the weight rate of graphite to copper oxide in the graphite composite powder was 93.8:6.2. A negative electrode was manufactured according to a method similar to that of Embodiment 1 using the graphite composite powder. The obtained negative electrode had a surface area of 8 cm$^2$ and a thickness of 78 μm.

The negative electrode of Embodiment 12 was evaluated in a manner similar to that of Embodiment 1. The discharge capacity at the second cycle was 535 mAh per unit volume of electrode, and the discharge capacity at the tenth cycle was 499 mAh.

EMBODIMENT 13

Graphite composite powder was fabricated according to a method similar to that of Embodiment 11 provided that the materials were prepared so that the weight ratio of graphite to copper oxide in the graphite composite powder was 89:11. A negative electrode was manufactured according a method similar to that of Embodiment 1 using the obtained graphite composite powder. The obtained negative electrode had a surface area of 8 cm$^2$ and a thickness of 76 μm.

The negative electrode of Embodiment 13 was evaluated in a manner similar to that of Embodiment 1. The discharge capacity at the second cycle was 424 mAh per unit volume of electrode, and the discharge capacity at the tenth cycle was 410 mAh.

EMBODIMENT 14

Graphite composite powder was fabricated according to a method similar to that of Embodiment 11 provided that the materials were prepared so that the weight ratio of graphite to copper oxide in the graphite composite powder was 79.6:20.4. A negative electrode was manufactured according to a method similar to that of Embodiment 1 using the obtained graphite composite powder. The negative electrode had a surface area of 8 cm$^2$ and a thickness of 80 μm.

The negative electrode of Embodiment 14 was evaluated in a manner similar to that of Embodiment 1. The discharge capacity at the second cycle was 420 mAh per unit volume of electrode, and the discharge capacity at the tenth cycle was 403 mAh.

EMBODIMENT 15

Graphite composite powder was fabricated according to a method similar to that of Embodiment 11 provided that the materials were prepared so that the weight ratio of graphite to copper oxide was 72.8:27.2 of the graphite composite powder. A negative electrode was manufactured according to a method similar to that of Embodiment 1 using the obtained graphite composite powder. The obtained negative electrode had a surface area of 8 cm$^2$ and a thickness of 79 μm.

The negative electrode of Embodiment 15 was evaluated in a manner similar to that of Embodiment 1. The discharge capacity at the second cycle was 380 mAh per unit volume of electrode, and the discharge capacity at the tenth cycle was 366 mAh.

EMBODIMENT 16

Graphite composite powder was fabricated according to a method similar to that of Embodiment 11 provided that the materials were prepared so that the weight ratio of graphite to copper oxide of the graphite composite powder was 59.3:40.7. A negative electrode was manufactured according to a method similar to that of Embodiment 1 using the obtained graphite composite powder. The negative electrode had a surface area of 8 cm$^2$ and a thickness of 83 μm.

The negative electrode of Embodiment 16 was evaluated in a manner similar to that of Embodiment 1. The discharge capacity at the second cycle was 372 mAh per unit volume of electrode, and the discharge capacity was 355 mAh at the tenth cycle.

EMBODIMENT 17

Graphite composite powder was fabricated according to a method similar to that of Embodiment 11 provided that the material was prepared so that the weight ratio of graphite to copper oxide in the graphite composite powder was 61.9:38.1. A negative electrode was manufactured according to a method similar to that of Embodiment 1 using the obtained graphite composite powder. The resulting negative electrode had a surface area of 8 cm$^2$ and a thickness of 81 μm.

The negative electrode of Embodiment 17 was evaluated in a manner similar to that of Embodiment 1. The discharge capacity at the second cycle was 375 mAh per unit volume of electrode, and the discharge capacity was 347 mAh at the tenth cycle.

EMBODIMENT 18

Graphite composite powder was fabricated according to a method similar to that of Embodiment 11 provided that the materials were prepared so that the weight ratio of graphite to copper oxide of the graphite composite powder was 57:43. A negative electrode was fabricated according to a method similar to that of Embodiment 1 using the obtained graphite composite powder. The resulting electrode had a surface area of 8 cm$^2$ and a thickness of 85 μm.

The negative electrode of Embodiment 18 was evaluated in a manner similar to that of Embodiment 1. The discharge capacity at the second cycle was 369 mAh per unit volume of electrode, and the discharge capacity was 344 mAh at the tenth cycle.

Comparative Example 12

A negative electrode was manufactured according to a method similar to that of Embodiment 1 using only denatured graphite powder (flake, particle size 7 μm, $d_{002}$=0.336 nm, Lc=22 nm, La=13 nm, R=0.1, specific surface area 10 m$^2$/g). More specifically, this negative electrode did not include copper oxide. The obtained negative electrode had a surface area of 8 cm$^2$ and a thickness of 77 μm.

The negative electrode of Comparative Example 12 was evaluated in a manner similar to that of Embodiment 1. The discharge capacity at the second cycle was 361 mAh per unit volume of electrode, and the discharge capacity at the tenth cycle was 340 mAh.

Comparative Example 13

Graphite composite powder was fabricated according to a method similar to that of Embodiment 11 provided that the materials were prepared so that the weight ratio of graphite to copper oxide of the graphite composite powder was 98.8:1.2. A negative electrode was manufactured using the obtained graphite composite powder according to a method similar to that of Embodiment 1. The obtained negative electrode had a surface area of 8 cm² and a thickness of 72 μm.

The negative electrode of Comparative Example 13 was evaluated in a manner similar to that of Embodiment 1. The discharge capacity at the second cycle was 363 mAh per unit volume of electrode, and the discharge capacity at the tenth cycle was 331 mAh.

Comparative Example 14

Graphite composite powder was fabricated according to a method similar to that of Embodiment 11 provided that the materials were prepared so that the weight ratio of graphite to copper oxide of the graphite composite powder was 53.5:46.5. A negative electrode was manufactured using the obtained graphite composite powder according to a method similar to that of Embodiment 1. The obtained negative electrode had a surface area of 8 cm² and a thickness of 87 μm.

The negative electrode of Comparative Example 14 was evaluated in a manner similar to that of Embodiment 1. The discharge capacity at the second cycle was 351 mAh per unit volume of electrode, and the discharge capacity at the tenth cycle was 314 mAh.

Comparative Example 15

Graphite composite powder was produced according to a method similar to that of Embodiment 11 provided that the materials were prepared so that the weight ratio of graphite to copper oxide in the graphite composite powder was 47.5:52.5. A negative electrode was manufactured using the obtained graphite composite powder according to a method similar to that of Embodiment 1. The obtained negative electrode had a surface area of 8 cm² and a thickness of 86 μm.

The negative electrode of Comparative Example 15 was evaluated in a manner similar to that of Embodiment 1. The discharge capacity at the second cycle was 319 mAh per unit volume of electrode, and the discharge capacity at the tenth cycle was 302 mAh.

Figure 3:
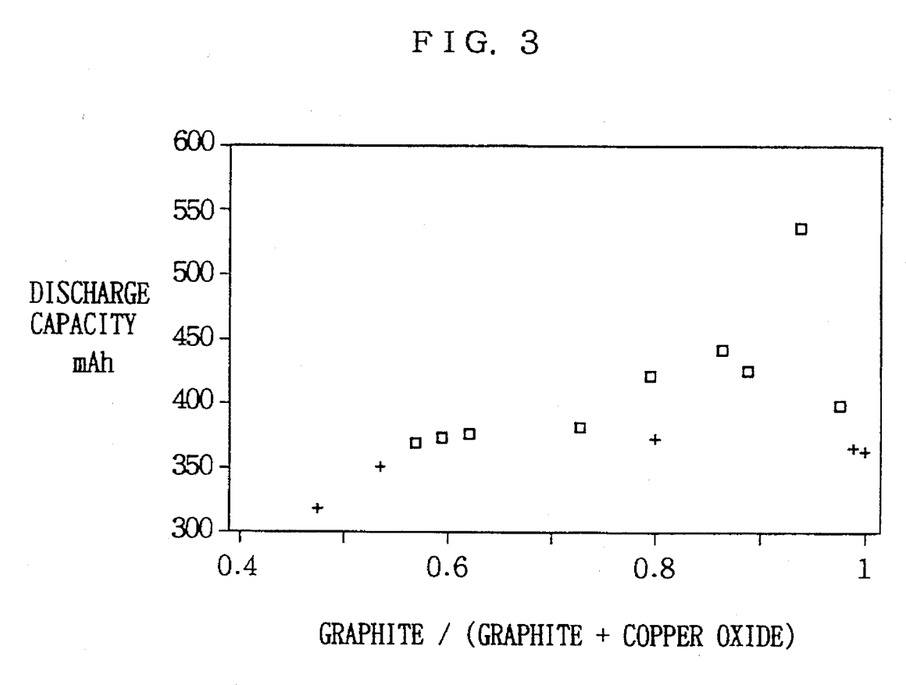
FIG. 3 is a graph showing discharge capacities depending upon the ratio of graphite to copper oxide in a negative electrode.

The results of Embodiments 10–18 and Comparative Examples 7 and 12–15 are shown in Table 3 and FIG. 3. In the graph of FIG. 3, the weight % of graphite in the graphite composite powder was plotted along the abscissa, and discharge capacity (mAh) was plotted along the ordinate. The □ symbol represents the results of the Embodiments, and the + symbol represents the results of the Comparative Examples. It is appreciated from Table 3 and FIG. 3 that the weight ratio of graphite to copper oxide in the graphite composite powder is preferably within the range of 98.5:1.5 to 55:45, more preferably in the range of 98.5:1.5 to 72:28 in order to obtain a greater discharge capacity. It is also appreciated that the discharge capacity of the negative electrode obtained by simply mixing graphite particles and copper oxide particles is relatively small as in Comparative Example 7.

TABLE 3

| | Discharge Capacity at Second Cycle | Discharge Capacity at Tenth Cycle | Weight Ratio of Graphic to Copper Oxide |
|---|---|---|---|
| Embodiment 10 | 440 mAh/cm³ | 415 mAh/cm³ | 86.6:13.4 |
| Embodiment 11 | 396 mAh/cm³ | 372 mAh/cm³ | 97.6:2.4 |
| Embodiment 12 | 535 mAh/cm³ | 499 mAh/cm³ | 93.8:6.2 |
| Embodiment 13 | 424 mAh/cm³ | 410 mAh/cm³ | 89:11 |
| Embodiment 14 | 420 mAh/cm³ | 403 mAh/cm³ | 79.6:20.4 |
| Embodiment 15 | 380 mAh/cm³ | 366 mAh/cm³ | 72.8:27.2 |
| Embodiment 16 | 372 mAh/cm³ | 355 mAh/cm³ | 59.3:40.7 |
| Embodiment 17 | 375 mAh/cm³ | 347 mAh/cm³ | 61.9:38.1 |
| Embodiment 18 | 369 mAh/cm³ | 344 mAh/cm³ | 57:43 |
| Comparative Example 7 | 371 mAh/cm³ | 335 mAh/cm³ | 80:20 |
| Comparative Example 12 | 361 mAh/cm³ | 340 mAh/cm³ | 100:0 |
| Comparative Example 13 | 363 mAh/cm³ | 331 mAh/cm³ | 93.8:1.2 |
| Comparative Example 14 | 351 mAh/cm³ | 314 mAh/cm³ | 53.5:46.5 |
| Comparative Example 15 | 319 mAh/cm³ | 302 mAh/cm³ | 47.5:52.5 |

EMBODIMENT 19

Artificial graphite (flake, particle size 7 μm, $d_{002}$=0.336 nm, Lc=22 nm, La=13 nm, R=0.1, specific surface area 10 m²/g) was used as graphite particles. Graphite composite powder was produced according to a method similar to that of Embodiment 3 provided that the beaker was heated for 20 hours on a hot plate maintained at 80° C. and then left for 28 hours at a room temperature of approximately 20° C. The obtained graphite composite powder consisted of graphite and copper (II) oxide CuO according to measurement by wide angle X-ray diffraction, and the weight ratio of graphite to copper oxide was 89:11.

The graphite composite powder was also observed using an SEM (Scanning Electronic Microscope). The graphite particle and the copper oxide particle included in the graphite composite powder had the average particle size of 7.5 μm and 2.5 μm, respectively.

The graphite composite powder was added with a solution containing N, N-dimethylformamide and polyvinylidene fluoride at the weight ratio of 1.5:0.05 and formed into paste. The weight ratio of the graphite composite powder and polyvinylidene fluoride was 91:9 after being dried. The paste was applied onto both sides of a stainless steel foil current collector, dried at 65° C., heat-treated at 155° C. pressed and dried at 260° C. under reduced pressure to remove water, whereby a negative electrode is formed. The resulting negative electrode had a surface area of 8 cm² and a thickness of 85 μm.

The negative electrode of Embodiment 19 was evaluated in a manner similar to that of Embodiment 1. The discharge capacity at the second cycle was 451 mAh per unit volume of electrode, and the discharge capacity at the tenth cycle was 427 mAh.

EMBODIMENT 20

Artificial graphite identical to that of Embodiment 19 was used as graphite particles. Graphite composite powder was fabricated using this artificial graphite powder according to a method similar to that of Embodiment 3 provided that the beaker was heated for 20 hours in a thermostat at 80° C. and then left for 24 hours at a room temperature of approximately 20° C. The obtained graphite composite powder consisted of graphite and copper (II) oxide CuO according to measurement by wide angle X-ray diffraction. The weight ratio of graphite to copper oxide was 89:11.

According to an SEM observation, the graphite particle and copper oxide particle in the graphite composite powder had the average particle size of 7.5 μm and 3 μm, respectively. A negative electrode was manufactured using this graphite composite powder according to a method similar to that of Embodiment 19. The obtained negative electrode had a surface area of 8 cm² and a thickness of 86 μm.

The negative electrode of Embodiment 20 was evaluated in a manner similar to that of Embodiment 1. The discharge capacity at the second cycle was 448 mAh per unit volume of electrode, and the discharge capacity at the tenth cycle was 426 mAh.

EMBODIMENT 21

Graphite composite powder was fabricated according to a method similar to that of Embodiment 3 using artificial graphite identical to that of Embodiment 19 as graphite particles provided that the solution in the beaker was maintained at a boiling state for ten hours, and then left for 24 hours at a room temperature of approximately 20° C. The obtained graphite composite powder consisted of graphite and copper (II) oxide CuO according to measurement by wide angle X-ray diffraction. The weight ratio of graphite to copper oxide was 89:11.

According to an SEM observation, the graphite particle and the copper oxide particle in the graphite composite powder had the average particle size of 7.5 μm and 1.8 μm, respectively. A negative electrode was manufactured using the graphite composite powder according to a method similar to that of Embodiment 19. The obtained negative electrode had a surface area of 8 cm² and a thickness of 85 μm.

The negative electrode of Embodiment 21 was evaluated in a manner similar to that of Embodiment 1. The discharge capacity at the second cycle was 453 mAh per unit volume of electrode, and the discharge capacity was 421 mAh at the tenth cycle.

EMBODIMENT 22

Graphite composite powder was fabricated using artificial graphite identical to that of Embodiment 19 as graphite particles in a manner similar to that of Embodiment 3 provided that the beaker was maintained for ten hours in a thermostat of 120° C. and then left for 24 hours at a room temperature of approximately 20° C. The obtained graphite composite powder was observed to be constituted of graphite and copper (II) oxide CuO according to measurement by wide angle X-ray diffraction. The weight ratio of graphite to copper oxide was 89:11.

According to an SEM observation, the graphite particle and the copper oxide particle in the graphite composite powder had the average particle size of 7.5 μm and 1.5 μm, respectively. A negative electrode was manufactured using the graphite composite powder according to a method similar to that of Embodiment 19. The obtained negative electrode had a surface area of 8 cm² and a thickness of 84 μm.

The negative electrode of Embodiment 22 was evaluated in a manner similar to that of Embodiment 1. The discharge capacity at the second cycle was 455 mAh per unit volume of electrode, and the discharge capacity at the tenth cycle was 423 mAh.

EMBODIMENT 23

Artificial graphite identical to that of Embodiment 19 was used as graphite particles. Graphite composite powder was fabricated according to a method similar to that of Embodiment 3 provided that the beaker was maintained for 20 hours in a thermostat of 80° C. and then maintained for 24 hours in a thermostat at 40° C. The obtained graphite composite powder consisted of graphite and copper (II) oxide CuO according to measurement by wide angle X-ray diffraction. The weight ratio of graphite to copper oxide was 89:11.

According to an SEM observation, the graphite particle and the copper oxide particle in the graphite composite powder had the average particle size of 7.5 μm and 3.5 μm, respectively. A negative electrode was manufactured using the graphite composite powder according to a method similar that of Embodiment 19. The obtained negative electrode had a surface area of 8 cm² and a thickness of 88 μm.

The negative electrode of Embodiment 23 was evaluated in a manner similar to that of Embodiment 1. The discharge capacity at the second cycle was 445 mAh per unit volume of electrode, and the discharge capacity at the tenth cycle was 418 mAh.

EMBODIMENT 24

Graphite composite powder was fabricated using artificial graphite identical to that of Embodiment 19, according to a method substantially similar to that of Embodiment 3. In the present Embodiment, the solution component in the beaker was suction-filtered using a glass separator (pore diameter of 1 μm) immediately after the beaker was heated for 20 hours on a hot plate of 80° C. A great amount of red-brown fine particles were included in the solution passing through the glass separator. This suction-filtering was carried out while rinsing the precipitant in the beaker until the filter solution was neutral. The solid of graphite composite remaining in the beaker after suction-filtering was dried under vacuum at 85° C. to prevent oxidation of the graphite particles. Then, the solid was ground to powder. The obtained graphite composite powder consisted of graphite and copper (II) oxide CuO according to measurement by wide angle X-ray diffraction. The weight ratio of graphite to copper oxide was 95:5.

The fine particles included in the solution passing through the glass separator was subject to wide angle X-ray diffraction measurement. It was observed that the fine particles consisted of copper (II) oxide. It was appreciated that a portion of fine copper oxide particles that have not yet grown sufficiently at room temperature have passed through the glass separator. This was due to the fact that the solution constituent in the beaker was immediately suction-filtered after the beaker was heated on a hot plate and not left for a predetermined time period at room temperature.

According to an SEM observation, the graphite particle and copper oxide particle in the graphite composite powder had the average particle size of 7.5 μm and 1.2 μm, respectively. The copper (II) oxide fine particles in the solution passing through the glass separator had the average particle size of 0.3 μm. A negative electrode was manufactured using the obtained graphite composite powder according to a method similar to that of Embodiment 19. The obtained negative electrode had a surface area of 8 cm² and a thickness of 71 μm.

The negative electrode of Embodiment 24 was evaluated in a manner similar to that of Embodiment 1. The discharge capacity at the second cycle was 411 mAh per unit volume of electrode, and the discharge capacity at the tenth cycle was 396 mAh.

Comparative Example 16

Graphite composite powder was produced using artificial graphite identical to that of Embodiment 19 according to a method similar to that of Embodiment 3 provided that the beaker was maintained at 20 hours in a thermostat of 80° C., and then maintained for 120 hours in a thermostat at 40° C. The obtained graphite composite powder consisted of graphite and copper (II) oxide CuO according to wide angle X-ray diffraction measurement. The weight ratio of graphite to copper oxide was 89:11.

According to an SEM observation, the graphite particle and the copper oxide particle in the graphite composite powder had the average particle size of 7.5 μm and 9 μm. A negative electrode was manufactured using the graphite composite powder according to a method similar to that of Embodiment 19. The obtained negative electrode had a surface area of 8 cm² and a thickness of 90 μm.

The negative electrode of Comparative Example 16 was evaluated in a manner similar to that of Embodiment 1. The discharge capacity at the second cycle was 408 mAh per unit volume of electrode, and the discharge capacity at the tenth cycle was 395 mAh.

The results of Embodiments 19–24 and Comparative Example 16 are shown in the following Table 4. It is appreciated from Table 4 that the particle size of an copper oxide particle is preferably smaller than that of a graphite particle from the standpoint of discharge capacity, and that the particle size of a copper oxide particle is preferably greater than the pore diameter of the glass filter from the standpoint of preventing loss of copper oxide particles.

TABLE 4

|  | Discharge Capacity at Second Cycle | Discharge Capacity at Tenth Cycle | Particle Size Ratio of Graphite to Copper Oxide |
| --- | --- | --- | --- |
| Embodiment 19 | 451 mAh/cm³ | 427 mAh/cm³ | 7.5:2.5 |
| Embodiment 20 | 448 mAh/cm³ | 426 mAh/cm³ | 7.5:3.0 |
| Embodiment 21 | 453 mAh/cm³ | 421 mAh/cm³ | 7.5:1.8 |
| Embodiment 22 | 455 mAh/cm³ | 423 mAh/cm³ | 7.5:1.5 |
| Embodiment 23 | 445 mAh/cm³ | 418 mAh/cm³ | 7.5:3.9 |
| Embodiment 24 | 411 mAh/cm³ | 396 mAh/cm³ | 7.5:1.2 |
| Comparative Example 16 | 408 mAh/cm³ | 395 mAh/cm³ | 7.5:9.0 |

EMBODIMENT 25

Manufacture of Negative Electrode

Graphite composite powder was produced according to a method similar to that of Embodiment 8. A nonionic dispersing agent and a polytetrafluoroethylene-dispersed solution were added to the graphite composite powder and formed into paste. (The weight ratio of the mixture of graphite composite powder to polytetrafluoroethylene was 91:9 after being dried.) The paste was applied into the pores of a nickel porous current collector. The paste-applied nickel porous current collector was dried at 60° C., heat-treated at 240° C., pressed, and then dried at 200° C. under reduced pressure to remove water, whereby a negative electrode was formed. The obtained negative electrode had a disc configuration with a diameter of 14.5 mm and a thickness of 0.41 mm.

Manufacture of Positive Electrode

Lithium carbonate, cobalt carbonate and antimony trioxide were mixed in a mortar such that the atom ratio of lithium, cobalt, and antimony was 1:0.95:0.05. The mixture was baked in air at 900° C. for 20 hours, and then ground to powder in the mortar. Thus, an active material powder was obtained. The active material had a composition of $Li_{0.98}Co_{0.95}Sb_{0.05}O_2$. The active material for a positive electrode was mixed with acetylene black, with addition of a nonionic dispersing agent and a polytetrafluoroethylene-dispersed solution, and then formed into paste. (The weight ratio of the active material, acetylene black and polytetrafluoroethylene was 100:10:5 after being dried.) The paste was applied onto a titanium mesh current collector, dried at 60° C., heat-treated at 240° C., pressed, and dried at 200° C. under reduced pressure to remove water. The formed positive electrode had a disc-like shape with a diameter of 14.5 mm and a thickness of 0.93 mm.

Assemble of Battery

As illustrated in FIG. 4, a current collector 2 for a positive electrode was welded onto the bottom of a can 1 for a positive electrode with an insulating packing 8 along the periphery. A positive electrode 3 was pressure-bonded on positive electrode current collector 2. Disposed on positive electrode 3 was a porous separator 7 of polypropylene, which was impregnated with an electrolytic solution in which 1 mol/l $LiPF_6$ was dissolved in a mixture solvent including ethylene carbonate, propylene carbonate and diethyl carbonate in the ratio of 2:1:3. A current collector 5 for a negative electrode was welded on the inner surface of a negative electrode can 4, and a negative electrode 6 was pressure-bonded on negative electrode current collector 5. Then, a coin type battery was manufactured by joining positive electrode can 1 and negative electrode can 4 via insulating packing 8 such that separator 7 and negative electrode 6 are in contact.

Evaluation of Battery

The resulting coin type battery was evaluated with a charge/discharge current of 2 mA. A charging operation was carried out at the constant current of 4.2 V for 12 hours when the charging voltage reached 4.2 V. The capacity of the battery was measured with the lower limit voltage of 2.5 V in a discharging operation. The battery was evaluated on the basis of the discharge capacity of the battery.

The average voltage at the time of discharge of the battery of Embodiment 25 was 3.7 V. The discharge capacity at the second cycle was 19 mAh, and 17 mAh at the tenth cycle.

Comparative Example 17

A negative electrode was manufactured according to a method similar to that of Embodiment 25 using only natural graphite powder from Madagascar. The negative electrode of Comparative Example 17 did not include copper (II) oxide. A battery was manufactured using the obtained negative electrode according to a method similar to that of Embodiment 25.

The battery of Comparative Example 17 was evaluated in a manner similar to that of Embodiment 25. The average voltage at the time of discharge was 3.7 V. The discharge capacity at the second cycle was 14 mAh per unit volume of electrode, and the discharge capacity at the tenth cycle was 13 mAh.

EMBODIMENT 26

Manufacture of Negative Electrode

Graphite composite powder was produced according to a method similar that of Embodiment 12. The graphite composite powder was added with a nonionic dispersing agent and a polytetrafluoroethylene-dispersed solution and formed into paste. (The weight ratio of the graphite composite powder and polytetrafluoroethylene was 91:9 after being dried.) The paste was applied into the pores of a nickel porous current collector, and then dried at 60° C., heat-treated at 240° C., pressed and dried again at 200° C. under reduced pressure to remove water, whereby a negative electrode was formed. The manufactured electrode had a disc-like shape with a diameter of 14.5 mm and a thickness of 0.37 mm.

Manufacture of Positive Electrode

Lithium carbonate and manganese dioxide were mixed in a mortar such that the atom ratio of lithium and manganese was 1.1:2. The mixture was baked in air at 900° C. for three days and then ground into powder in the mortar. The composition of the powder available as an active material was $LiMn_2O_4$. The active material for the positive electrode was mixed with a conductive material which includes acetylene black and exfoliated graphite in the weight ratio of 2:1. The mixture with addition of a nonionic dispersing agent and a polytetrafluoroethylene dispersed solution was formed into paste. (The weight ratio of the positive electrode active material, the conductive material and polytetrafluoroethylene was 100:10:5 after being dried.) The paste was applied onto a titanium mesh current collector, and dried at 60° C., heat-treated at 240° C., pressed, and dried again at 200° C. under reduced pressure to remove water, whereby a positive electrode was formed. The formed positive electrode had a circular plate shape with a diameter of 14.5 mm and a thickness of 1.0 mm.

Assemble of Battery

A coin type battery was fabricated according to a method substantially identical to Embodiment 18 provided that an electrolytic solution was prepared by dissolving 1 mol/l $LiPF_6$ in a mixture solvent containing ethylene carbonate, γ-butylolactone, and diethyl carbonate in the ratio of 3:1:3.

Evaluation of Battery

The coin type battery of Embodiment 26 was evaluated with a charge/discharge current of 1 mA. A charging operation was carried out at the constant voltage of 4.2 V for 24 hours after the charging voltage reached 4.2 V. The capacity of the battery was observed with the lower limit voltage as 2.5 V at the time of discharge. The battery was evaluated on the basis of the discharge capacity.

The average voltage of the battery of Embodiment 26 was 3.7 V at the time of discharge. The discharge capacity at the second cycle was 20 mAh, and the discharge capacity at the tenth cycle was 15 mAh.

Comparative Example 18

A negative electrode was manufactured according to a method similar to that of Embodiment 25 using only denatured graphite (flake, particle size 7 μm, $d_{002}$=0.336 nm, Lc=22 nm, La=13 nm, R=0.1, specific surface area 10 m²/g). The present negative electrode does not include copper (II) oxide. A battery was manufactured according to a method similar to that of Embodiment 25 using the obtained negative electrode.

The battery of Comparative Example 13 was evaluated in a manner similar to that of Embodiment 26. The average voltage at discharge was 3.7 V. The discharge capacity at the second cycle was 13 mAh, and the discharge capacity at the tenth cycle was 12 mAh.

The results of Embodiments 25 and 26 and Comparative Examples 17 and 18 are shown in the following Table 5. It is appreciated from Table 5 that a lithium secondary battery of higher capacity can be manufactured by employing graphite composite powder including copper (II) oxide as the negative electrode in comparison with the case where a negative electrode not including copper oxide is used.

Thus, according to the present invention, a lithium secondary battery of high capacity with high voltage can be provided at low cost by a simple manufacturing process.

TABLE 5

|  | Discharge Capacity at Second Cycle | Discharge Capacity at Tenth Cycle |
|---|---|---|
| Embodiment 25 | 19 mAh/cm³ | 17 mAh/cm³ |
| Embodiment 26 | 20 mAh/cm³ | 15 mAh/cm³ |
| Comparative Example 17 | 14 mAh/cm³ | 13 mAh/cm³ |
| Comparative Example 18 | 13 mAh/cm³ | 12 mAh/cm³ |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a negative electrode for a lithium secondary battery, comprising the steps of:

mixing graphite particles, which as a main constituent permits intercalation and de-intercalation of lithium ions, and a compound including copper ions, forming copper hydroxide at least of a part on the surface of at least a part of said graphite particles by a chemical reaction in a solution containing said compound including copper ions and an alkali compound, obtaining graphite composite powder having copper oxide particles formed at least on a part of the surface of at least a part of said graphite particles by dehydrating said copper hydroxide to convert the same into copper oxide particles, and mixing a binding material into said graphite composite powder.

2. The manufacturing method according to claim 1, wherein said graphite particles have a particle size of not more than 80 μm, and said copper oxide particles have a particle size smaller than that of said graphite particles.

3. The manufacturing method according to claim 1, wherein the weight ratio of said graphite particles to said copper oxide particles is within the range of 98.5:1.5 to 55:45.

4. The manufacturing method according to claim 1, wherein the weight ratio of said graphite composite powder to said binding material is within the range of 99:1 to 70:30.

5. The manufacturing method according to claim 1 wherein said compound including copper ions is copper sulfate.

6. The manufacturing method according to claim 1 wherein said alkali compound is lithium hydroxide.

7. The manufacturing method according to claim 1 wherein said compound including copper ions is copper sulfate and said alkali compound is lithium hydroxide.

8. The manufacturing method according to claim 1 wherein said solution has an alkali compound of a mole ratio greater than 2 times that of copper ions.

9. The manufacturing method according to claim 1 wherein said compound including copper ions is copper acetate hydrate and said alkali compound is lithium hydroxide.

10. A method of making a negative electrode material for a secondary lithium battery comprising, mixing copper sulfate and graphite powder, forming a solution by adding water to the mixture of copper sulfate and graphite powder to dissolve the copper sulfate, adding to the solution an alkali compound of a mole ratio greater than two times that of copper ions in the solution, heating the solution to a predetermined temperature for a sufficient period of time to form a gel of copper oxide hydrate on the surface of the graphite powder particles, and dehydrating to form copper oxide particles on the surface of the graphite powder particles.

11. The method of claim 10 further including mixing in a binding material with the formed copper oxide particles on the surface of the graphite powder particles.

12. The method of claim 10 further including suction-filtering the solution prior to the dehydrating step.

\* \* \* \* \*